March 22, 1949. G. H. KOCH 2,464,816
AIR TRANSLATING APPARATUS

Filed May 19, 1945 3 Sheets-Sheet 1

WITNESSES:
Louis Nichos
E. H. Lutz

INVENTOR
GUSTAV H. KOCH
BY R. J. Eisinger
ATTORNEY

INVENTOR
GUSTAV H. KOCH
BY R. J. Eisinger
ATTORNEY

March 22, 1949.  G. H. KOCH  2,464,816
AIR TRANSLATING APPARATUS
Filed May 19, 1945  3 Sheets-Sheet 3

WITNESSES:

INVENTOR
GUSTAV H. KOCH
BY
ATTORNEY

Patented Mar. 22, 1949

2,464,816

UNITED STATES PATENT OFFICE 2,464,816

AIR TRANSLATING APPARATUS

Gustav H. Koch, Springfield, Mass., assignor to Westinghouse Electric Corporation, East Pittsburgh, Pa., a corporation of Pennsylvania Application May 19, 1945, Serial No. 594,716

6 Claims. (Cl. 172—36)

My invention relates to an electric motor, more particularly to the motor of an electric fan.

An object of the invention is to provide a construction of motor that may be produced at lower cost.

Another object is to provide a construction in which the motor casing is divided generally along a plane parallel to and adjacent or containing the axis of rotation and in which the bearings and the stator are held firmly in place with continued use.

It has heretofore been known to make a motor having a casing divided along an axial plane, the stator and the bearings being clamped between the two parts of the casing. However, in order that the bearings and the stator may be clamped between the casing parts, it has been necessary closely to control their manufacture, otherwise one or more of the parts will be loose. Even if accurately made initially, looseness may result after a period of use.

In accordance with my invention, one of the casing parts is provided with seats to receive the stator and the bearings. One or more of the latter parts, for example the two bearings, are held against their seats by springs interposed between the bearings and the other casing part. One or more of the parts, for example, the stator in the illustrated embodiment, may be clamped directly between the two casing parts. Thus, all the members are firmly held against the seats in the one casing part, notwithstanding inaccuracies in manufacture or deformation of the metal resulting from continued use or repeated assembly and disassembly.

These and other objects are effected by my invention as will be apparent from the following description and claims taken in accordance with the accompanying drawings, forming a part of this application, in which:

Figure 1:
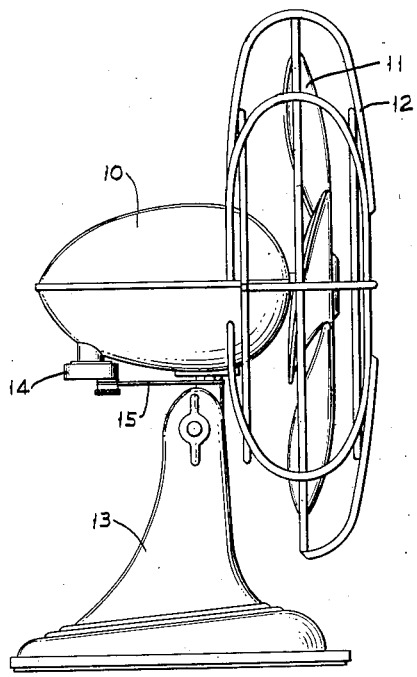
Fig. 1 is a side elevation of an electric fan in which my invention is incorporated.

The fan shown in Fig. 1 comprises a motor 10, a blade wheel 11 and a fan guard 12. The motor 10 is mounted on a base 13 and is adapted to oscillate thereon, an oscillating mechanism 14 and a crank rod 15 providing such oscillation.

Figure 2:
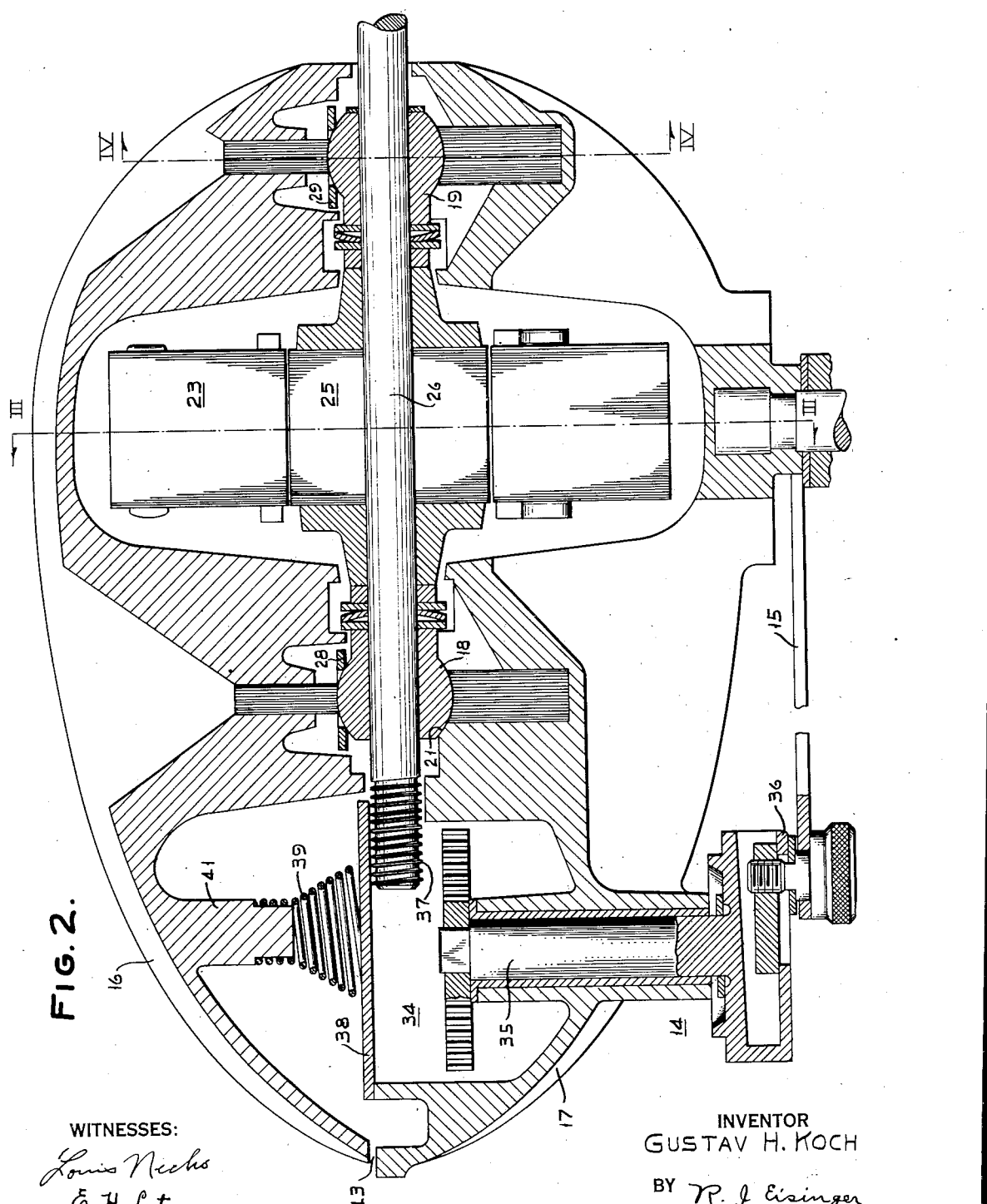
Fig. 2 is a longitudinal vertical section through the motor, including the gear casing of the oscillating mechanism.
Figure 3:
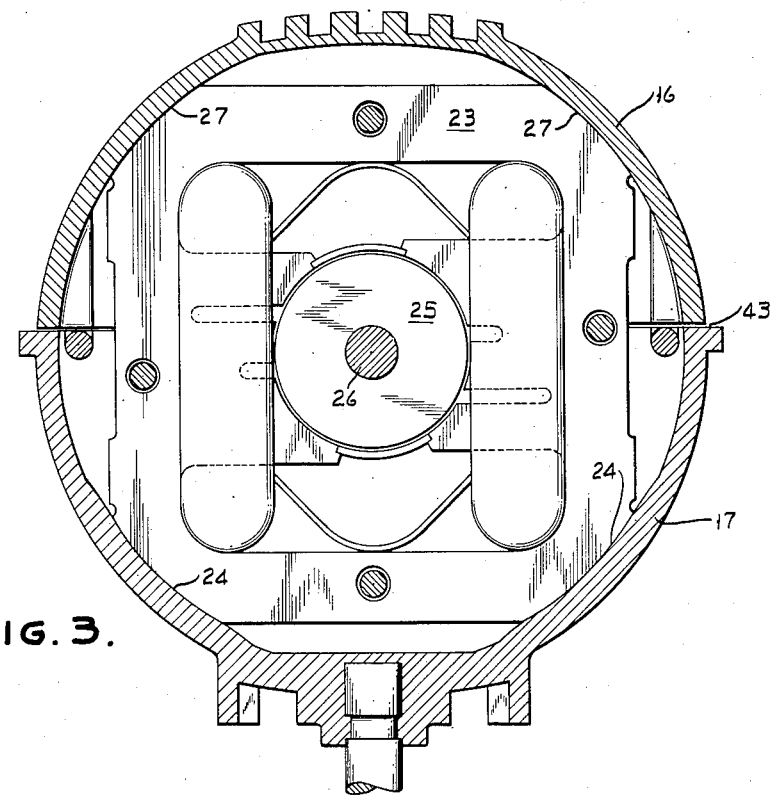
Figs. 3 and 4 are transverse sections taken on the lines III—III and IV—IV, respectively, of Fig. 2.
Figure 4:
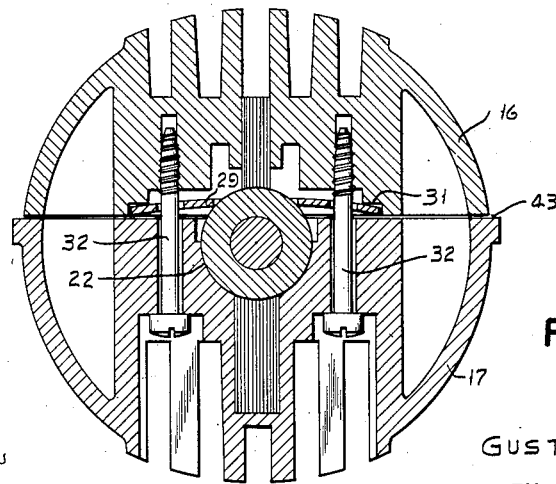

Referring now to Figs. 2, 3 and 4, the motor casing is divided generally along a horizontal plane extending parallel to the axis of rotation, in this case disposed slightly above the axis, thereby providing an upper casing part or cover 16 and a lower casing part or base 17. Each of these casing parts is of such construction as to permit casting of all surfaces, including the exterior surface, the bearing seats, seats for the field, fan guard seats, lubricating and oil return passages, gear case, spring seats, assembly screw holes, oil holes, bearing inserts and inner surface, all in one direction, vertically, without the use of side cores in the die. Such construction reduces the cost of the die and increases the speed of the casting operation. Also, since there are no side cores, the flash and gate trimming operations are simplified to the point of performing these cleaning operations in one trimming die with one stroke of the press.

The motor further includes bearings 18 and 19 seating in bearing seats 21 and 22 formed in the lower casing part 17. A field or stator 23 seats against coined surfaces 24 in the lower casing part. A rotor 25 is mounted on a shaft 26 which is supported in the bearings 18 and 19. The upper casing part 16 bears against the stator 23 at the upper corners thereof, as indicated at 27. The stator 23, therefore, is clamped directly between the two casing parts and held firmly thereby. The bearings 18 and 19 are held firmly against their seats by spring members 28 and 29 which extend horizontally over the bearings transversely of the motor. The spring members are initially flat but are bowed as shown in Fig. 4 when the two parts of the casing are bolted together. At their intermediate portions, the spring members bear downwardly on the bearings. Downwardly-facing shoulders or surfaces 31 formed in the upper casing part 16 bear downwardly on the opposite ends of the spring members. The relative location of parts is such that the spring members are substantially deflected when the casing parts are bolted together so that the springs exert a substantial force pressing the bearings against their seats. The two casing parts are bolted together by bolts 32, two of which are disposed on opposite sides of each of the bearings 18 and 19, as illustrated in Fig. 4.

The lower casing part 17 is also formed to provide a chamber 34 for the gearing of the oscillating mechanism. Such gearing includes a shaft 35 extending downwardly through the bottom of the casing and having a crank portion 36 connected to the connecting rod 15. The shaft 26 is formed with a worm 37 to drive the gearing. For simplicity of illustration, the remaining parts of the gearing are not shown since such gearing may be of well-known conventional form. The top of the gear chamber 34 is closed by a cover 38, which cover is held down and kept in place by a spring 39 mounted on and carried by a projection 41 of the upper casing part 16.

Figure 6:
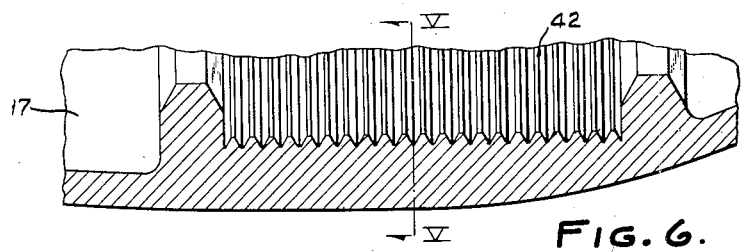
Figs. 5 and 6 are sectional views showing the serrated surface from which one of the coined seats for the stator is formed, the sections being taken on the line V—V of Fig. 6 and the line VI—VI of Fig. 5, respectively.
Figure 7:
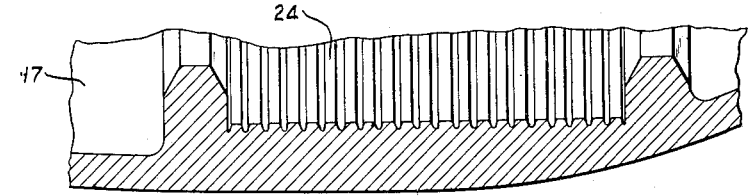
Fig. 7 is a sectional view similar to Fig. 6 but showing the surface after the serrations have been flattened or coined to provide the seat for the stator.
Figure 5:
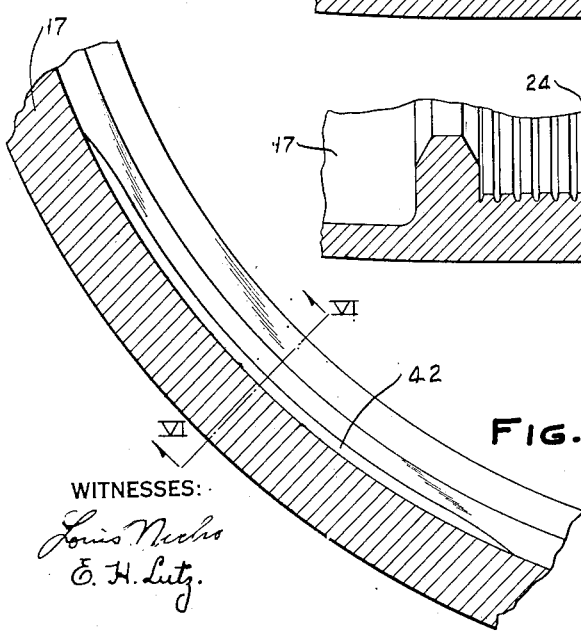

In order to provide alignment of the shaft and the rotor with respect to the field 23, the seats 24 for the field are coined and the bearing seats 21 and 22 are coined; in other words, they are formed in a coining press after the casting is made. In order to reduce the coining pressure required, particularly of the seats 24, the casting is made with serrations or ribs 42, as shown in Fig. 6. The casting is then placed in a coining press in which the coining die bears down upon the serrations or ribs 42 and flattens them to the form shown in Fig. 7. Since the metal is required to flow only within each individual rib or serration, it will be apparent that the pressure required is greatly reduced.

In assembling the motor, the shaft, the bearings, the rotor and the field or stator are placed in the lower casing part with the bearings and the field engaging their respective seats. The oscillating mechanism including its gearing is assembled and the cover 38 placed over the chamber 34. The relatively flat spring members 28 are positioned over the bearings 18 and 19. The cover is then positioned over the parts theretofore assembled. At this time, the shoulders 31 rest upon the ends of the springs 28 and 29. The bolts 32 are then inserted and tightened to pull the upper casing part 16 down toward the lower casing part until it seats firmly upon the field 23, as shown at 27, in Fig. 3. As the upper casing part is drawn downwardly, the shoulders 31 bear downwardly on the ends of the springs and cause them to bow, as shown exaggerated in Fig. 4. Such deflection imposes a downward pressure on the bearings, holding them firmly against their seats.

The casing parts are preferably formed so that when they are drawn together as shown in Figs. 2 and 3, there will be a slight clearance as indicated at 43. In other words, the casing parts are spaced from each other in a direction normal to the plane of division between the casing parts. This insures that, even with manufacturing tolerances or variations, it will always be possible to abut the upper casing part against the field 23. Similarly, it permits such engagement with the field notwithstanding deformation of the upper casing part due to bolting.

The lower casing part is preferably made of greater thickness and strength in order to maintain alignment between the rotor and the stator. Thus, any distortion or deformation caused by high stresses imposed by the bolts is applied to the upper casing part or cover, whose distortion does not affect alignment.

It will be seen that the stator and the bearings are held in alignment by engagement with their seats in the base or lower casing part. The stator is held against its seat by the cover, which is in direct contact with the stator. Inaccuracies of the cover are immaterial because the cover is simply pulled down by the bolts until the stator is tightly clamped between the two casing parts. The bearings are also held against their seats in the base by the cover, but indirectly through the springs which firmly hold the bearings against the seats, notwithstanding variations in the exact location of the surfaces of the cover. Thus, alignment is obtained merely by accurately locating the three seats in the base. It is not necessary to form the cover with surfaces which are disposed in accurate relation to the seats in the base to simultaneously clamp the stator and the bearings therebetween.

While the illustrated embodiment comprises springs for holding the bearings against their seats, it is to be understood that so far as the broad invention is concerned, any one or more of the three members which are to be maintained in alignment, namely, the stator and the bearings, may be held against their seats in the base by springs interposed between the members and the upper casing part.

From the above description it will be seen that I have provided a construction in which the bearings and the stator or field are held in accurate alignment by accurately formed seats in one of the casing parts and that, due to the use of the springs, the stator and the bearings are held firmly notwithstanding variations or inaccuracies in manufacture or by changes in the other casing part that may occur with the passing of time.

While I have shown my invention in but one form, it will be obvious to those skilled in the art that it is not so limited, but is susceptible of various changes and modifications without departing from the spirit thereof.

What I claim is:

1. A motor comprising a casing divided into first and second parts generally along a plane parallel to and adjacent or containing the axis of rotation, a shaft, a rotor on the shaft, a stator member, two bearing members for the shaft, the first casing part being formed with seats for said stator and bearing members to locate the same in axial alignment, means for securing the casing parts together, the second casing part rigidly contacting one of said members to hold the same against its seat, surfaces of said first and second casing parts which oppose each other in a direction normal to said plane being spaced from each other in such direction, so that said one member may be rigidly held between said casing parts notwithstanding manufacturing variations, and a spring disposed between the second casing part and another one of said members, said spring being deflected upon securing the casing parts together to press the last-mentioned member against its seat in the first casing part, the third member being held against its seat by said second casing part.

2. A motor comprising a casing divided into first and second parts generally along a plane parallel to and adjacent or containing the axis of rotation, a shaft, a rotor on the shaft, a stator, two bearings for the shaft, the first casing part being formed with seats for said bearings and said stator to locate the same in axial alignment, means for securing the casing parts together, the second casing part rigidly contacting the stator to hold the same against its seat, and springs disposed between the second casing part and said bearings and being deflected upon securing the casing parts together to press said bearings against said seats in the first casing part.

3. A motor comprising a casing divided into first and second parts generally along a plane parallel to and adjacent or containing the axis of rotation, a shaft, a rotor on the shaft, a stator, two bearings for the shaft, the first casing part being formed with seats for said stator and said bearings to locate the same in axial alignment, means for securing the casing parts together, the second casing part rigidly contacting said stator to hold the same against its seat, surfaces of said first and second casing parts which oppose each other in a direction normal to said plane being spaced from each other in such direction, so that said stator member may be rigidly held between said casing parts notwithstanding manufacturing variations, and springs disposed between the second casing part and said bearings, said springs being deflected upon securing the casing parts together to press the bearings against their seats in the first casing part.

4. A motor comprising a casing divided into first and second parts generally along a plane parallel to and adjacent or containing the axis of rotation, a shaft, a rotor on the shaft, a stator, two bearings for the shaft, the first casing part being formed with seats for said stator and said bearings to locate the same in axial alignment, means for securing the casing parts together, and springs disposed between the second casing part and said bearings and being deflected upon securing the casing parts together to press said bearings against said seats in the first casing part, said stator being held against its seat by said second casing part.

5. A motor for an oscillating fan comprising the construction set forth in claim 2, wherein said first casing part is formed with a gear chamber, and further including a cover for said gear chamber and a spring interposed between said cover and said second casing part for holding said cover against said gear chamber.

6. A motor comprising a shaft, a rotor on the shaft, a stator member, two bearing members for the shaft, a frame member extending longitudinally of the axis of rotation of the motor, said frame member having seats formed therein facing toward one side of said axis for locating said stator and bearing members in alignment along said axis, a retaining member attached to said frame member and serving to hold said stator member against its seat, a spring coacting between said retaining member and said bearing member for holding the same against its seat, and a spring for holding the other bearing member against its seat.

GUSTAV H. KOCH.

REFERENCES CITED

The following references are of record in the file of this patent:

UNITED STATES PATENTS

| Number | Name | Date |
|---|---|---|
| 1,499,298 | Eller | June 24, 1924 |
| 2,011,493 | Larsh | Aug. 13, 1935 |
| 2,048,763 | Whiteley | July 28, 1936 |
| 2,308,609 | Koch | Jan. 19, 1943 |
| 2,352,958 | Lauer | July 4, 1944 |